March 22, 1927.   R. L. LEE   1,621,937

MOTOR

Filed Nov. 24, 1923

Inventor
Ralph L. Lee
By Spencer, Sewall + Hardman
His Attorneys

Patented Mar. 22, 1927.

1,621,937

UNITED STATES PATENT OFFICE.

RALPH L. LEE, OF DAYTON, OHIO, ASSIGNOR TO DELCO-LIGHT COMPANY, OF DAYTON, OHIO, A CORPORATION OF DELAWARE.

MOTOR.

Application filed November 24, 1923. Serial No. 676,831.

The invention relates to series electric motors and particularly to apparatus for preventing racing or overspeeding under light loads or under no load.

The racing of motors has been prevented by providing the motor armature with circuits including one or more closed loops surrounding certain of the armature core teeth. Currents induced in these loops tend to hold back the armature of the motor and thereby tend to prevent overspeeding of the armature.

One of the objects of the invention is to simplify the manner of constructing the closed loops, and to accomplish this aim, one form of the invention includes an open-slotted laminated armature core having strips of conducting material extending along the slots and electrically connected with certain end laminations of the armature core.

Further objects and advantages of the present invention will be apparent from the following description, reference being had to the accompanying drawings, wherein a preferred embodiment of one form of the present invention is clearly shown.

Figure 1:
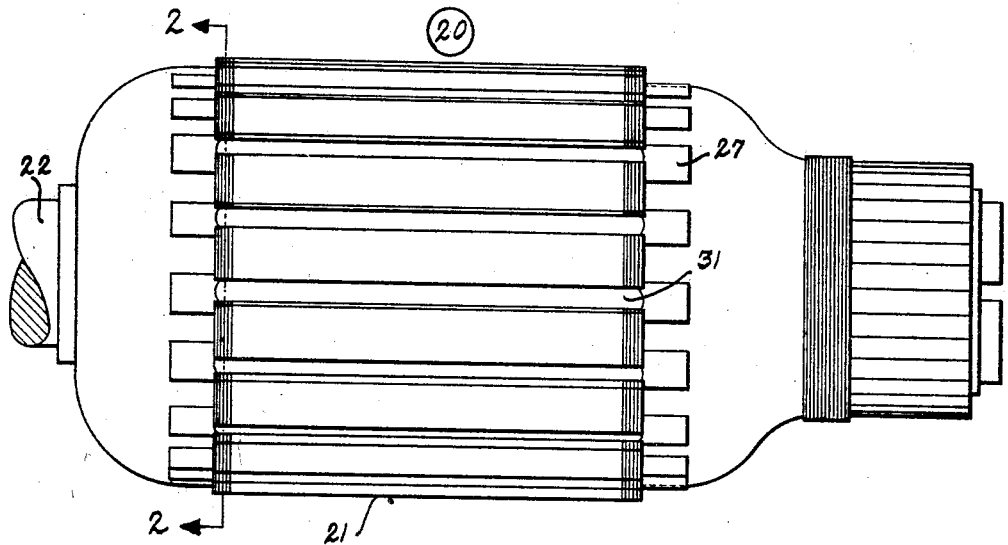
Fig. 1 is a view in elevation of an armature including the present invention.
Figure 2:
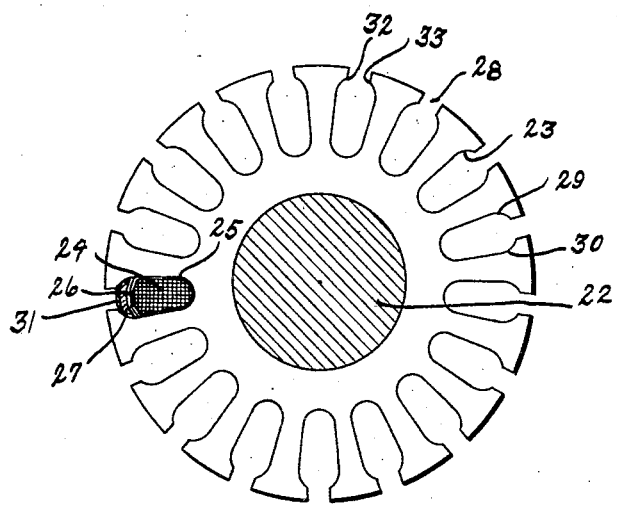
Fig. 2 is a sectional view taken on the line 2—2 of Fig. 1, the armature windings being shown in but one of the armature slots.

Referring to the drawings, an armature 20 of the series wound type is provided with a laminated core 21 mounted on a shaft 22 and having open slots 23 in which armature windings 24 are adapted to be laid. The windings 24 are insulated from the core 21 by a split sleeve 25, preferably of fish paper. A strip of fish paper 26 is slipped along the slot 23 over the top of windings 24 to cover the slit in sleeve 25. A stick 27, of insulating material, such as fiber, of a width greater than the width of the mouth opening 28 of slot 23, is driven into the slot 23 from the end thereof. The edges of the stick 27 engage the curved surfaces 29 and 30 of the slot 23 and wedge the windings 24, paper sleeve 25 and paper strip 26 securely within the slot 23. Stick 27 is somewhat longer than the slot 23 so that when inserted in the slot 23, the ends thereof extend beyond the ends of slot 23 for a purpose to be described.

The last few laminations on each end of core 21 are plated, before the core is assembled on shaft 22, with one of the metals of which a solder compound may be composed, such as tin. Then strips or bars 31 of conducting material preferably of relatively high resistance, which have also been plated with a similar metal, are inserted from the ends of slots 23 along the top of sticks 27. These strips 31 are substantially as long as slots 23, and are greater in width then the mouth opening 28 of slot 23. Shoulders 32 and 33 tend to maintain strips 31 within the slots 23. Strips 31 are electrically connected at their ends with the plated end laminations by dropping solder on the ends of said strips and permitting the solder to flow to the plated laminations. The plating of strips 31 and the end laminations of the core permit soldering without the use of acid, which would be detrimental to windings 24 should it drop upon them. The portions of sticks 27 extending beyond the ends of slots 23 prevent solder dropping down upon the armature windings and thus causing short circuits.

When the motor is under a light load or no load, the field thereof will be weak and the armature will tend to speed up. Currents induced in the closed loops formed by strips 31 around the core teeth tend to oppose the current flowing in windings 24 and thus cut down the speed of the armature. By using a relatively large number of strips 31 in the armature core, the heat generated in these strips is more evenly distributed about the armature and hot spots are avoided.

While the form of embodiment of the invention as herein disclosed, constitutes a preferred form, it is to be understood that other forms might be adopted, all coming within the scope of the claims which follow.

What is claimed is as follows:

1. An armature comprising, in combination, a plurality of laminæ placed side by side to provide a single core, said core being provided with slots extending axially therewith, armature windings within said slots, and conductor bars within said slots the opposite ends of said bars being secured to a plurality of laminæ at the opposite ends of said core for preventing racing of the armature.

2. An armature comprising in combination, a core provided with slots, armature windings within said slots, sleeves for insulating the windings from the core, means for retaining the sleeves and windings in the slots, and conducting bars supported by said means within the slots and electrically connected adjacent their ends with said core for preventing racing of the armature.

3. An armature comprising, in combination, a plurality of laminæ placed side by side to provide a single core, said core being provided with slots extending axially therewith, armature windings within said slots, and conductor bars within said slots, and located nearer to the periphery of the core than the armature windings, and connected with the core adjacent opposite ends thereof for preventing racing of the armature.

In testimony whereof I hereto affix my signature.

RALPH L. LEE.